(No Model.) 2 Sheets—Sheet 1.
A. P. BLIVEN.
CONSTRUCTION OF SHIPS.
No. 484,888. Patented Oct. 25, 1892.
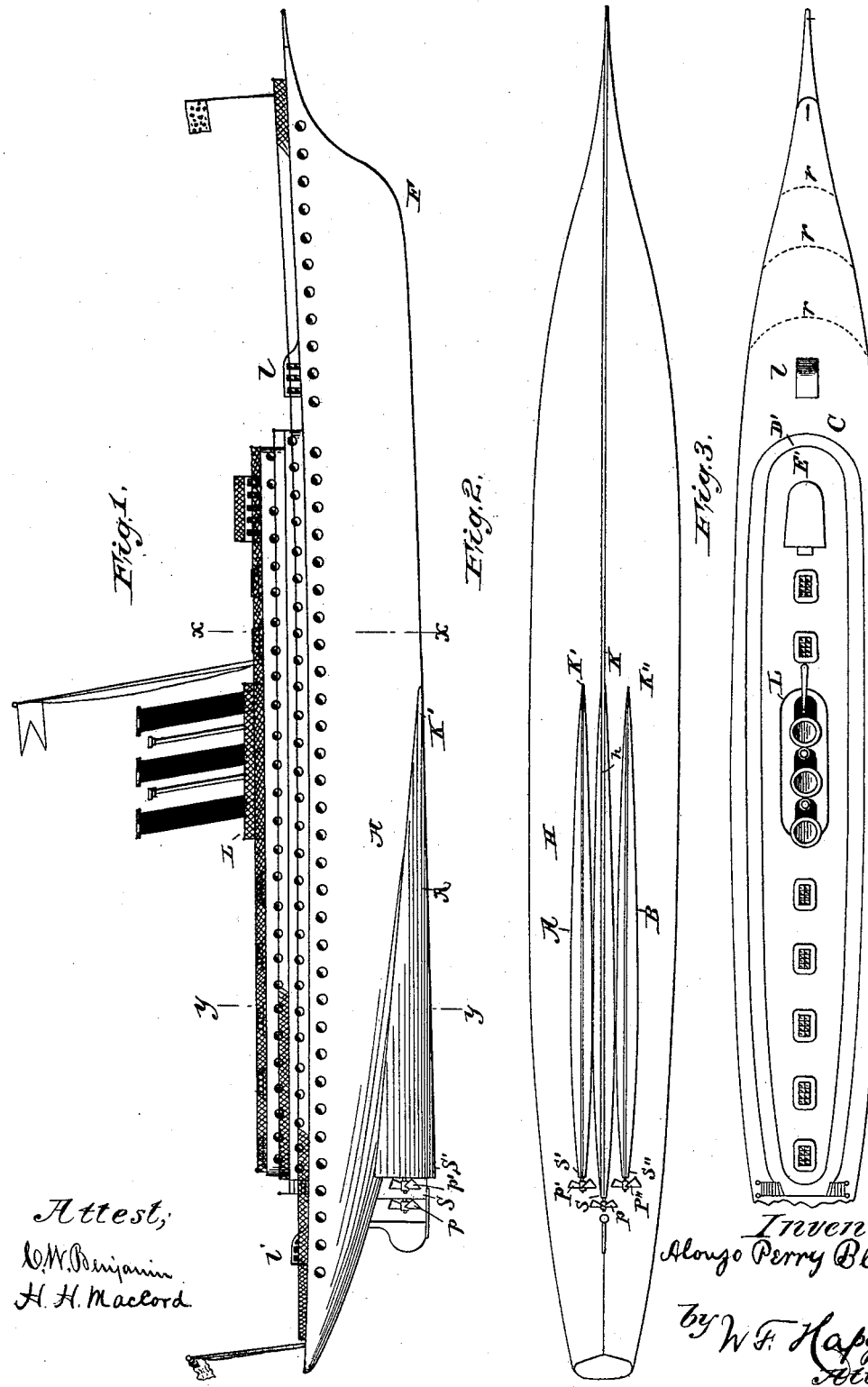

(No Model.) 2 Sheets—Sheet 2.

A. P. BLIVEN.
CONSTRUCTION OF SHIPS.

No. 484,888. Patented Oct. 25, 1892.

Attest:
C. M. Benjamin.
H. H. MacCord.

Inventor:
Alonzo Perry Bliven
by W. F. Hapgood.
Atty.

THE NORRIS PETERS CO., PHOTO-LITHO., WASHINGTON, D. C.

UNITED STATES PATENT OFFICE.

ALONZO PERRY BLIVEN, OF BROOKLYN, NEW YORK.

CONSTRUCTION OF SHIPS.

SPECIFICATION forming part of Letters Patent No. 484,888, dated October 25, 1892.

Application filed March 17, 1892. Serial No. 425,338. (No model.)

*To all whom it may concern:*

Be it known that I, ALONZO PERRY BLIVEN, a citizen of the United States, residing at Brooklyn, in the county of Kings and State of New York, have invented certain new and useful Improvements in the Construction of Ships, of which the following is a specification.

My invention relates particularly to vessels propelled by steam, and has for its objects the production of a ship which shall possess absolute safety under all conditions, increased speed and superior sea-going qualities, better accommodations for passengers, greater provisions for buoyancy, provision for more effective location of machinery and propellers, and steadier running when under way.

Figure 4:
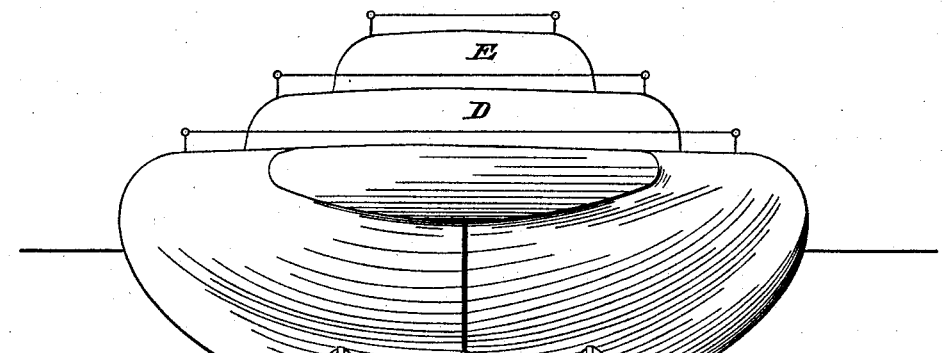
Figure 5:
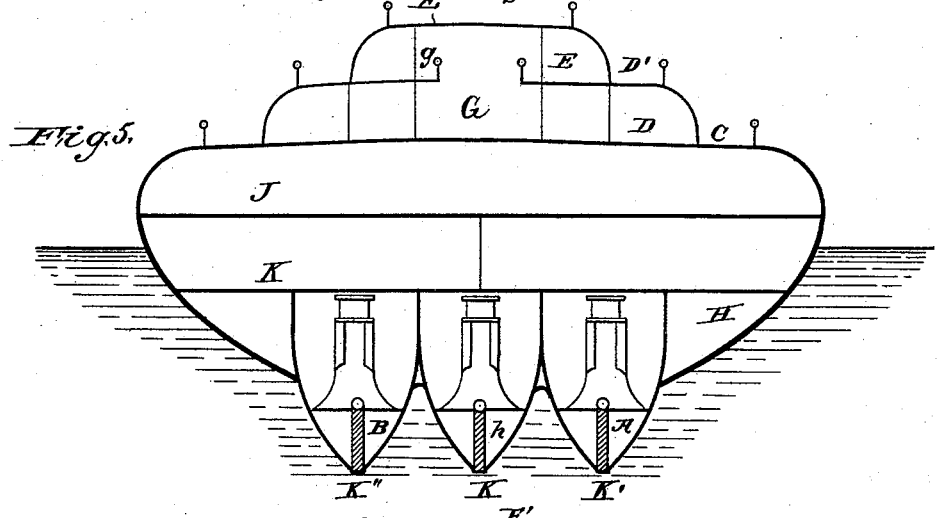
Figure 6:
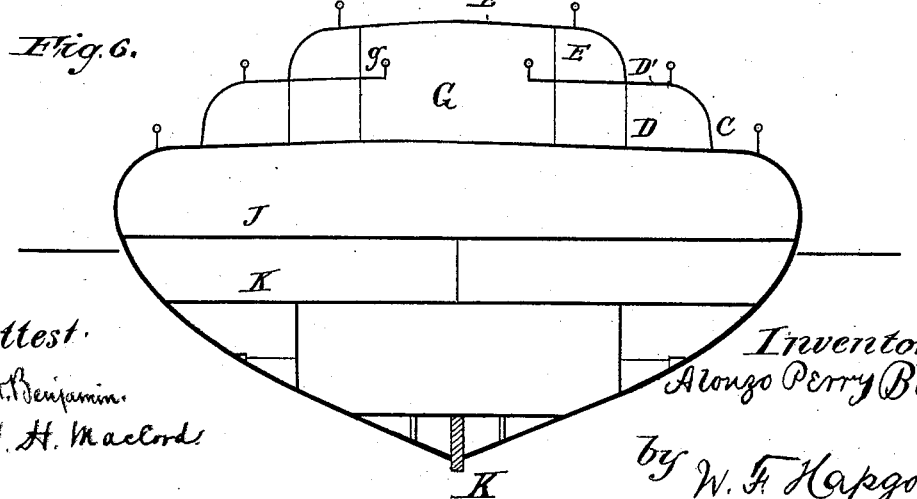

In the accompanying drawings, Figure 1 shows an elevation of the complete vessel. Fig. 2 is a view of the hull as seen from below. Fig. 3 is a plan view. Fig. 4 is a stern view. Fig. 5 is a sectional view at $y\ y$, Fig. 1, and Fig. 6 is the midship-section at $x\ x$.

The drawings show a vessel having fine lines, especially in the after-body, where the run is unusually long and easy, and with a keel-line which gradually rises from the stern-post S, the point of greatest draft forward. Commencing just aft of the midship-section, Fig. 6, two narrow hulls A and B spring from the main hull H, one on each side of the main keel K, and they extend aft parallel with each other and with the central portion of the main hull to separate stern-posts S' and S'', located somewhat forward of the main stern-post S. The keels K' K'' of the lateral hulls correspond with the horizontal plane of the main keel K, and the portion $h$ of the main hull, which lies between the narrow lateral hulls, is drawn in to correspond with them in form and dimensions. This converts the lower portion of the after-half of the vessel into three narrow hulls with open water-ways between.

The rudder is located at the after end of the main keel K in the usual manner, where also one of the three screw-propellers $p$ is located. The other two propellers $p'$ and $p''$ are located directly aft of the stern-posts S' and S'' of the two lateral hulls A and B, which furnish most efficient stern-bearings for them, thus obviating the use of any outside supporting-brackets, which offer great resistance in their passage through the water. The side screws $p'$ and $p''$ turn in solid water, (on all sides,) which comes to them both from without and through the passages between the narrow after hulls, there being no immersed portion of the main hull forward of them to disturb the water. Thus the screws are enabled to work to their full efficiency, and, being located forward of the central screw $p$ and turning in opposite directions, they transmit a large volume of solid water directly to it and enable it to operate effectively. By this arrangement I am enabled to use small screws with better results than can be attained with large screws as usually applied. With these smaller screws and my improved construction I am also enabled to keep my propellers farther below the surface of the water and to place them farther forward than usual at the present time, and as a consequence it is practically impossible for them to be thrown out of the water by the pitching of the ship, thus avoiding the unpleasant "racing" of the screws and consequent loss of speed.

The superstructure of the vessel consists of two domed deck-houses D and E, above the domed spar-deck C and extending some three-fourths the length of the ship. These houses are of a width to leave commodious gangways on each side, and their ends are curved to a circular form. The upper part of the walls of these two houses curve inward to join the decks D' E' above in a species of dome or arch, while the top sides of the hull also tumble home with a gradual curve to form the spar-deck C. This form of construction, while giving great strength and stiffness, also offers little resistance to the waves which may break on board, and as the superstructure is framed to form an integral portion of the hull there is little danger of its being injured by heavy seas. This arrangement provides two rows of state-rooms for passengers on either side of the deck-house D, one lighted by dead-lights in the outer wall of the house and the other from the large two-story saloon G, Figs. 5 and 6, and an upper tier of state-rooms on each side of the upper house E, which opens on the galley $g$ in the large saloon and are lighted by dead-lights in the outer wall. This arrangement, while accommodating a large number of passengers, provides an unusual amount of light and ventilation.

The large two-story-saloon space G affords unusually-fine accommodations for dining-saloon and other cabin arrangements, being light, easy to ventilate, and entirely removed and protected from the noise and smell of the machinery.

The main deck J is continuous and unbroken from stem to stern, except for the passage of an oval bulk-head L, which extends from the upper deck E to the hold and through which pass the funnels, ventilators, and ladders, giving the only access from the decks to the engines and fire-rooms. The spar-deck D is also unbroken, except by two companion-ways $l\ l'$, one leading to the crews' quarters and the other to the steerage, and which are closed by water-tight doors. By this arrangement the space between the main and spar decks J and D, may be tightly closed and supplies a displacement sufficient to float the vessel even with the entire hold full of cargo and all compartments flooded with water, thus rendering the vessel practically unsinkable. The cargo is handled through large ports opening on lower deck N, which can be tightly closed when not in use.

At the bow of the vessel I place three collision bulk-heads $r\ r\ r$, Fig. 3, extending from the spar-deck D to the keel and conveniently spaced, and I curve these bulk-heads with their convex side forward, as shown, in order to obtain greater strength to resist pressure from forward in case the bow is damaged by collision.

The improved construction with the three narrow hulls aft, each with its own keel and separate framing, provides a very stiff and efficient foundation for the engines, which are located as indicated in Fig. 5, while the bearings of each of the shafts, having substantial foundations on the separate keels, are not liable to spring or break. The boilers are also located in this portion of the hull, where they are not liable to disturbance from the springing of the hull. The lower lines of the three keels K, K', and K'', all being in the same plane, form a very stable support for the vessel when docked and obviate the use of bilge-blocks. They would also maintain the vessel in an upright position in case she went ashore. The triple hull, also, is conducive to easy motion of the ship, as it greatly reduces the rolling, being much more effective than bilge-keels or similar devices.

What I claim, and desire to secure by Letters Patent, is—

1. A ship having a fore-body of the usual form and an after-body beginning at or near the midship-section, subdivided into three distinct hulls, each provided with a separate keel and stern-post, the said hulls uniting a short distance below the water-line into one hull, substantially as set forth.

2. A ship having a fore-body of the usual form and an after-body beginning at or near the midship-section, subdivided into three distinct hulls A $h$ B, the two outer hulls A B terminating some distance forward of the center hull in the stern-posts S' S'', which form independent supports for the propeller-screws $p'\ p''$, the said three hulls uniting with and merging into the main hull H some distance below the water-line, substantially as set forth.

3. A ship having the lower portion of its after-body subdivided into three distinct hulls and whose top sides tumble inward on a circular curve to join the deck C, the whole surmounted by one or more deck-houses D E, one above the other, said deck-houses having their ends rounded and the upper portion of their walls curved inward to form arched decks above, substantially as described.

4. A ship having the lower portion of its after-body subdivided into three distinct hulls A $h$ B and whose top sides tumble home on a curve to join the deck C, and one or more houses D E, surmounted by curved decks D' E', in combination with one or more curved collision bulk-heads $r\ r$, extending from the spar-deck C to the keel, substantially as described.

5. A ship having its main deck J unbroken by any openings, a spar-deck C, penetrated only by two water-tight companion-ways $l\ l'$, and the oval bulk-head L, extending from the upper promenade-deck E' to the hold and inclosing all funnels, ventilators, and ladders from the lower portion of the ship, the said decks and bulk-head inclosing a space exceeding in buoyancy the entire displacement of the loaded hull, substantially as and for the purpose set forth.

ALONZO PERRY BLIVEN.

Witnesses:
 HERBERT J. HINDES,
 H. H. MACCORD.